June 30, 1964 T. BUDZICH 3,139,006

CONSTANT SPEED HYDRAULIC DRIVE

Filed Sept. 11, 1961 2 Sheets-Sheet 1

INVENTOR
TADEUSZ BUDZICH

INVENTOR.
TADEUSZ BUDZICH

United States Patent Office 3,139,006
Patented June 30, 1964

3,139,006
CONSTANT SPEED HYDRAULIC DRIVE
Tadeusz Budzich, 3344 Colwyn Road, Cleveland 20, Ohio
Filed Sept. 11, 1961, Ser. No. 137,352
10 Claims. (Cl. 91—199)

This invention relates generally to fluid apparatus and has particular significance in connection with the speed control of a fluid motor.

In more particular aspects this invention relates to speed control of a fluid motor of a type where the rotation of a controlling element, operating at a low torque level, is reproduced with minimum angular error by the rotation of the fluid motor shaft at a high torque level.

In prior art, devices of this class control speed of fluid motor by either changing the volume flow of the pump or employing a throttling device operated by a speed governor driven from the motor output shaft. Those types of speed controls are both inefficient and expensive. A different type of speed control, described in my United States Patent No. 2,979,037 issued April 11, 1960, employs the rotation of a controlling element operating at low torque level to maintain an average speed of output shaft of the motor at high torque level. Although this control, because of its simplicity, is useful in applications of continuous rotary torque multiplication it does not maintain the exact angular relationship between the control element and the driven load.

It is an object of the present invention to provide a speed control of a fluid motor in which both the speed and the angular position of the low power rotating control element will be reproduced by the fluid motor at high torque level with minimum error.

Another object of the present invention is to provide a speed control of a fluid motor where the rotating control element at low power level can be driven at varying speeds, the fluid motor following its rotation, accelerating and braking the driven load within its maximum torque capacity.

Other objects and advantages of the present invention will be apparent from the following description, reference being had to the accompanying drawings showing clearly a preferred embodiment in which.

Figure 1:
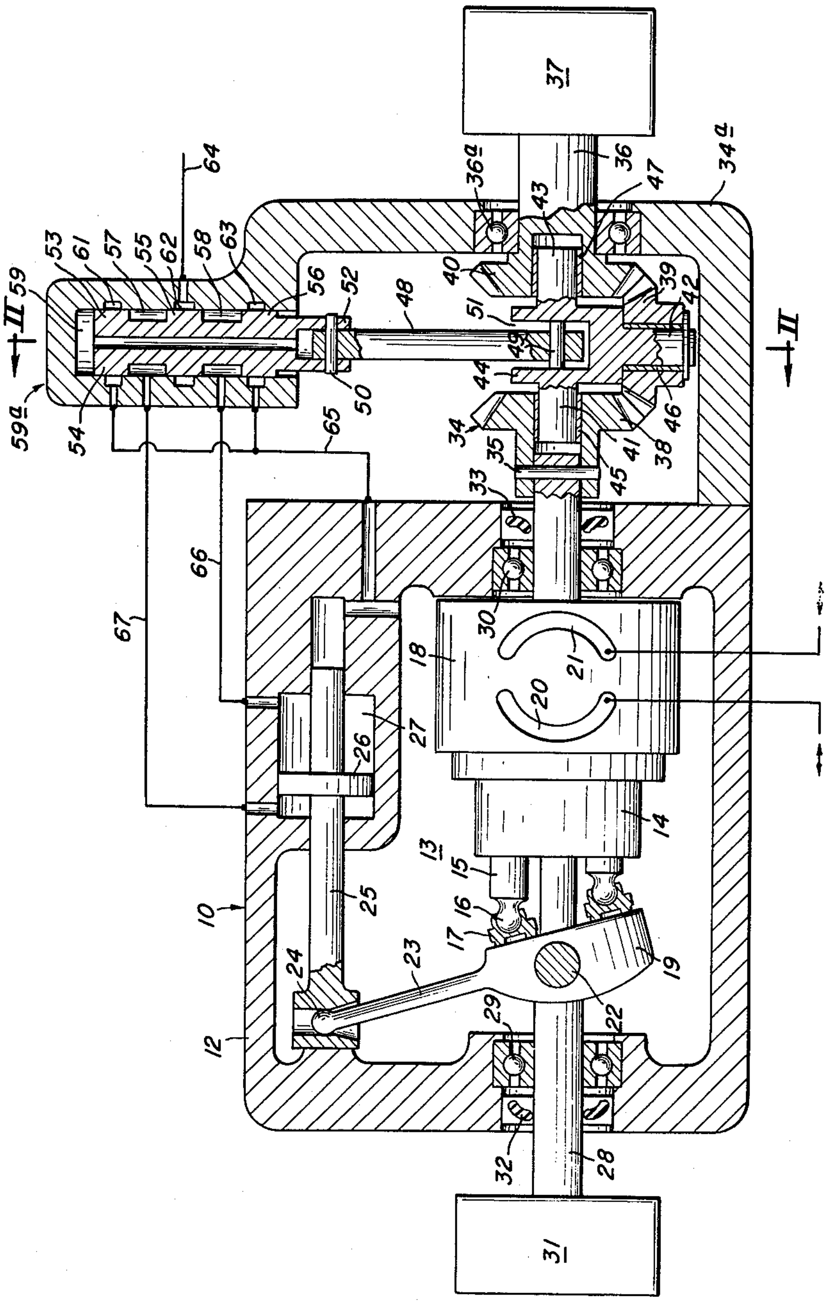
FIGURE 1 is a horizontal section view of a fluid motor with timing mechanism, a driven load and a rotating control element shown diagrammatically.

Referring now to the drawings, and particularly to FIGURE 1, a constant speed drive is shown which includes a motor 10 of the axial piston type. A housing 12 defines a chamber 13 having a rotatable cylinder barrel 14 positoned therein. The cylinder barrel 14 is provided with plurality of cylinder bores each having a piston 15 axially slidable therein. Pistons 15 have spherical ends 16 universally mounting piston shoes 17. The cylinder barrel 14 is positioned axially between a valve plate 18 and a thrust plate or cam plate 19. The valve plate 18 with diagrammatically shown porting passages 20 and 21 in a well known manner provides properly phased fluid connections between cylinder bores of the cylinder barrel 14. The thrust plate 19 is tiltably mounted with respect to the housing 12 on pins 22. An extension 23 of thrust plate 19 has spherical pivot 24 engaging a control piston rod 25 of a control piston 26. The control piston 26 is slidably mounted in control piston chamber 27 provided in the housing 12. A drive shaft 28, journalled in the housing 12 by bearings 29 and 30, is connected to the cylinder barrel 14 and is effective to transmit torque from cylinder barrel 14 to diagrammatically shown load 31 and is suitably sealed by seals 32 and 33. A differential drive 34 is located in cover 34*a*. The differential drive 34 comprises bevel gears 38, 39 and 40 drivingly engaged and journalled on locating pins 41, 42 and 43 respectively of a differential cage 44 in sleeve bearings 45, 46 and 47 respectively. The pins 41 and 43 have a common axis of rotation. The bevel gear 38 is keyed by driving pin 35 to the drive shaft 28. The bevel gear 40 is connected by shaft 36, journalled in bearing 36*a* to a diagrammatically shown speed control element 37. The element 37 is any suitable device which will provide a constant rotational speed, such as an induction motor. As can be seen from the drawings the element 37 will rotatively drive the shaft 28 through gears 38, 39 and 40. A connecting link 48 engages by pivot pin 49 a slotted portion 51 of the differential cage 44 and through pivot pin 50 a slotted end 52 of a control valve spool 53, see FIGURE 2. The pin 49 is eccentrically mounted with respect to the axis of the pins 41 and 43, and hence will have a vertical vector of movement if the differential cage 44 moves pivotally about the axis of the pins 41 and 43. This will cause vertical movement of the link 48 which will in turn cause vertical movement of the valve spool 53. The control valve spool 53 has lands 54, 55 and 56 defining spaces 57 and 58 and is axially slidable in a control bore 59. The control bore 59 is located in the bracket 34*a* and has annular grooves 61, 62 and 63. Annular groove 62 is connected through passage 64 to a source of high pressure oil, not shown. Annular grooves 61 and 63 are connected through passage 65 to the chamber 13 and low pressure oil. Spaces 57 and 58 are connected by passages 66 and 67 to the opposite ends of the control piston chamber 27.

Figure 3:
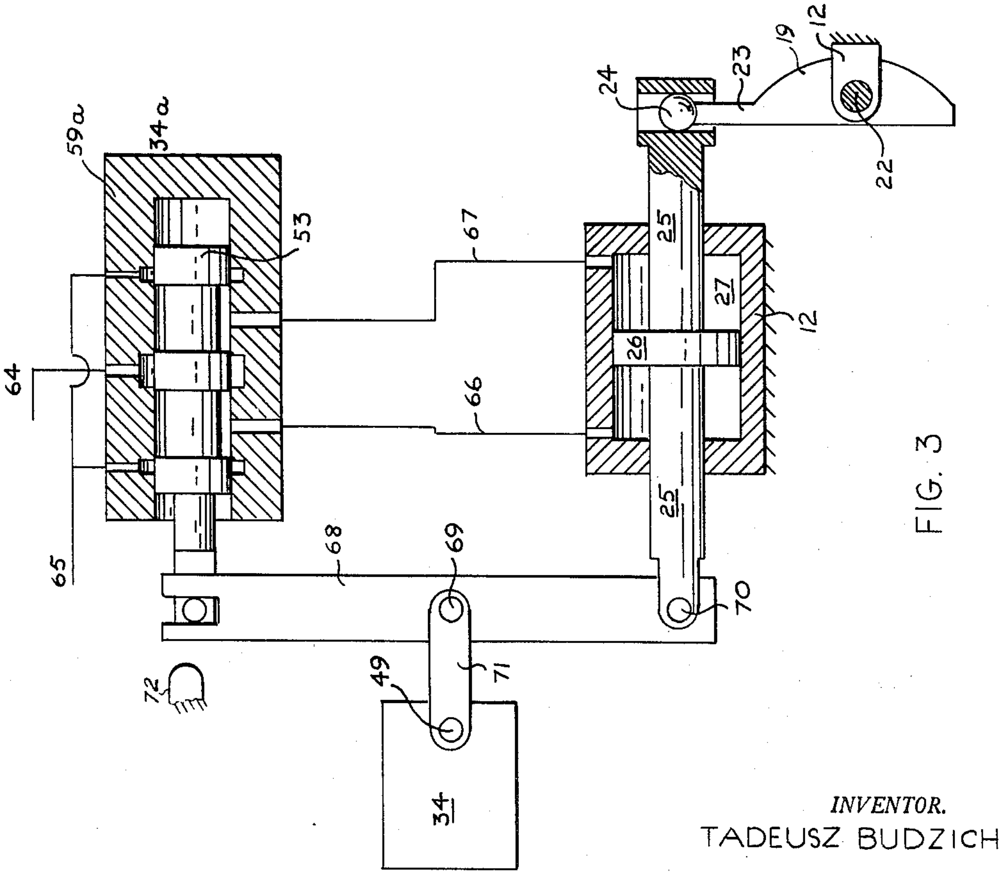
FIGURE 3 is a graphical representation of control components of FIGURE 1 operated by a control link.

FIGURE 3 shows a graphical representation of the components shown in FIGURE 1 operated through control link 68. A connecting link 71 pivotally engages the differential cage 44 through pin 49 and centrally engages the control link 68 by pin 69. One end of the control link 68 engages the spool 53 and the other end of the control link 68 engages the piston 25 by a pin 70.

*Operation*

With porting passage 20 connected to source of high pressure oil and porting passage 21 to exhaust the fluid motor in a well known manner will transmit torque to load 31. The magnitude of the transmitted torque will depend on pressure differential acting across porting passages 20 and 21 and the angular inclination of the thrust plate 19 with respect to the axis of rotation of the cylinder barrel 14. When the spool 53 is moved up, high pressure fluid flows from line 64 to groove 62 and into space 58. From space 58 the fluid will flow through line 66 into chamber 27 and urge the control piston to the left as seen in FIGURE 1. This will increase the angle of the thrust plate 19 which will increase the torque of the motor thus causing the motor to speed up. When the spool 53 is moved down as seen in FIGURE 1, fluid will flow from groove 62 to space 57 and then to the chamber 27 through line 67. This will urge the piston 26 to the right as seen in FIGURE 1 which will decrease the angle of the thrust plate thus slowing the motor down. When tilting the thrust plate 19 around pins 22 from the position as shown in FIGURE 1 the torque developed by the motor will gradually decrease from maximum to zero and increase from zero to maximum in sector of reverse rotation. The zero torque condition occurs when the thrust plate is perpendicular to the axis of rotation of the motor. The tilting movement of the thrust plate 19 is induced by unbalanced hydraulic forces developed on the control piston 26. The oil under pressure is supplied to either end of the control piston chamber 27 by the control valve 59*a* as described above. The control valve spool 53 is actuated by connecting link 48 pivoted on differential cage 44 of differential drive 34.

Figure 2:
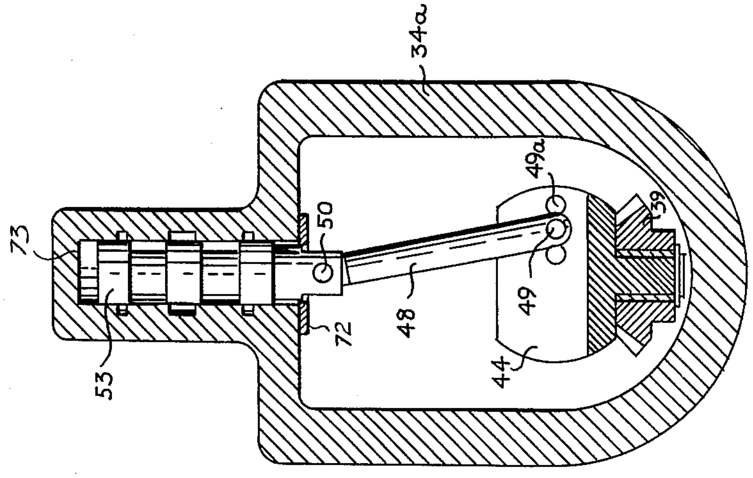
FIGURE 2 is a sectional view taken along the line 2—2 of FIGURE 1 through the motor control mechanism.

The speed control element 37 is arranged to drive bevel gear 40 of differential drive 34 in a direction opposite to that of the driven load 31. As long as the drive shaft 28 revolves at the same speed as the speed control element 37, the differential cage 44 will remain stationary and free floating on locating pins 41 and 43. Any difference in speed of rotation between the drive shaft 28 and the speed control element 37 however will induce a clockwise or anticlockwise rotation of the differential cage 44 about the axis of the pins 41 and 43 depending upon whether the drive shaft 28 is revolving slower or faster than the speed control element 37. Referring to FIGURE 2, the clockwise or anticlockwise rotation of the differential cage 44 through connecting link 48 will move the control valve spool 53 either up or down. The resulting change in the torque developed by the fluid motor will regulate the speed of rotation of the load 31.

With the load 31 lagging or speed control element 37 leading with respect to any selected reference speed of rotation the thrust plate 19 will be rotated by the control piston 26 in an anticlockwise direction as seen in FIGURE 1 increasing the torque output of the fluid motor and accelerating the load 31 until it will reach the required speed of rotation. Then the angular inclination of the thrust plate 19 is changed to a position equivalent to steady state condition, maintaining the control speed. With load 31 revolving faster than the speed control element the rotation of the differential cage 44 will move control valve spool 53, admitting high pressure oil through passage 67 to the control piston chamber 27. The thrust plate 19 will be revolved in a clockwise direction as seen in FIGURE 1, reducing the torque developed by the fluid motor. If the braking action is necessary the thrust plate 19 will be moved over-center, changing the operation of the unit in a well known manner from motoring to pumping, thus absorbing the energy from the load 31 to maintain its controlled speed.

In a steady state condition a change in magnitude of load 31 will change the fluid motor speed. This change in speed acting through the differential drive 34 will automatically correct the angle of inclination of the thrust plate 19 to maintain the preselected control speed.

The basic feature of a differential drive is that the torque transmitted to the differential cage is limited to the minimum torque applied to either of the input shafts of the differential. The torque developed by the speed control element 37 is so selected that it is capable of overcoming the static friction of the control valve spool 53. The angular movement of the differential cage 44, necessary to move the control valve spool 53 from its neutral position, depends on the radial distance of pivot pin 49 from the center of rotation of differential cage 44, see FIGURE 2. This radial distance is made adjustable by positioning pivot pin 49 in one of a series of radially spaced holes 49*a* to decrease or increase the sensitivity of the control. The difference in angular velocity between the speed control element 37 and the load 31 will move control valve spool 53 against surface 73 or stop 72 depending on the speed control element lagging or leading the load. The angular position and the speed of rotation of the load 31 will then be corrected at the maximum rate of acceleration or deceleration while the speed control element 37 is being driven at the speed of the load. During the speed correction the differential cage 44 is providing the driving reaction with control valve spool 53 resting against the stop, changing the differential drive into a straight through gear train.

In FIGURE 3 the control elements shown in FIGURES 1 and 2 are connected through control link 68 which is pivotally mounted intermediate to its ends on the diagrammatically shown differential drive 34 through link 71 and pivot pins 49 and 69. Movement of the differential cage of the differential drive as described above will rotate the control link 68 around pin 70 moving the control valve spool 53. The movement of the control valve spool 53 from its neutral position will connect through passage 66 or passage 67 high pressure fluid to control piston chamber 27, moving the control piston 26. The hydraulic connections are so arranged that the resulting movement of the control piston 26 through pin 70 will rotate the control link 68 around pivot pin 69 gradually bringing the control valve spool 53 back to its neutral position. The movement of the control piston 26, rotating thrust plate 19, will change the displacement and therefore the speed of the motor. In the arrangement as shown in FIGURE 3 linear movement of the pivot pin 69, actuated by the differential drive 34, will be followed at a higher force level by a proportional movement of the control piston 26 and thrust plate 19. The control shown in FIGURE 3 performs in the same way as that shown in FIGURES 1 and 2 except that the correction in the angular displacement between the load 31 and speed control element 37, translated into the motion of the differential cage, is proportionally transmitted to the thrust plate 19, proportionally changing the displacement of the motor.

While I have described particular embodiment, various modifications may obviously be made without departing from the true spirit and scope of my invention which I intend to define in the appended claims.

I claim:

1. A fluid pressure translating device comprising in combination, a fluid motor, said motor having a rotating barrel, a stationary tiltable cam plate, a plurality of pistons disposed in said barrel and adapted to coact against said cam plate, a drive shaft connected to said barrel and adapted to drive a load, valve means arranged to admit and discharge fluid to said pistons to rotate said cylinder barrel, control means, said control means including a differential, said differential having a first gear drivingly connected to said cylinder barrel, a second gear drivingly connected to a low power input speed control means rotatable at a constant speed, a third gear drivingly interconnecting said first and second gears, said gears being mounted to allow angular displacement of said third gear when the speed of the driven load differs from the speed of the low input speed control means, and means to change the angle of said cam plate responsive to angular displacement of said third gear.

2. The combination of claim 1 wherein said means to change the angular displacement of the cam plate includes pressure responsive means operatively connected to said third gear.

3. A fluid pressure energy translating device comprising in combination a fluid motor, said motor having at least one cylinder bore and a piston reciprocal therein, a reaction member adapted to coact with each piston, displacement changing means to vary the displacement of each piston, a drive shaft rotatably driven by said motor, valving means arranged to phase fluid into and out of each cylinder bore to drive each piston, power control means, said control means including low power input speed control means, differential means drivingly interconnected between said drive shaft and said low power input speed control means adapted to compare the relative angular displacement of the two, and means connected to said displacement changing means and actuatable by said differential means to change the displacement of said pistons responsive to the relative angular displacement of said speed control means and said drive shaft, whereby to provide a controlled speed torque multiplier.

4. A fluid pressure energy translating device comprising in combination a fluid motor, said motor having at least one cylinder bore and a piston reciprocal therein, a reaction member adapted to coact with each piston, means to move said reaction member to change the displacement of each piston, a drive shaft rotatably driven by said motor, valving means arranged to phase fluid into and out of each cylinder bore to drive the piston, power control means, said control means including low power input speed control means, differential drive means drivingly interconnected between said drive shaft and said low power input speed control means adapted to compare the relative angular displacement of the two, and means connected to said displacement changing means and actuable by said differential to change the displacement of said pistons responsive to the relative angular displacement of said speed control means and said drive shaft whereby to provide a controlled speed torque multiplier.

5. A fluid pressure energy translating device comprising in combination a fluid motor, said motor having a rotating cylinder barrel, said cylinder barrel having a plurality of cylinder bores and pistons reciprocally disposed therein, a reaction member adapted to coact with said pistons, means to move said reaction member to change the displacement of each piston, a drive shaft operably connected to said cylinder barrel and rotatable therewith, valving means arranged to phase fluid into and out of each cylinder bore to drive each piston, power control means, said control means including low power input speed control means, differential drive means drivingly interconnected between said drive shaft and said low power input speed control means adapted to compare the relative angular displacement of the two, and means connected to said displacement changing means and actuatable by said differential to change the displacement of said pistons responsive to the relative angular displacement of said speed control means and said drive shaft whereby to provide a controlled speed torque multiplier.

6. A fluid pressure energy translating device comprising in combination a fluid motor, said motor having a rotating cylinder barrel, said cylinder barrel having a plurality of cylinder bores and pistons reciprocally disposed therein, a cam plate adapted to coact with said pistons, means to vary the cam plate angle to thereby vary the displacement of the pistons, a drive shaft operably connected to said cylinder barrel and rotatable therewith, valving means arranged to phase fluid into and out of each cylinder bore to drive each piston, power control means, said control means including low power input speed control means, differential drive means drivingly interconnected between said drive shaft and said low power input speed control means adapted to compare the relative angular displacement of the two, and means connected to said displacement changing means and actuatable by said differential to change the displacement of said pistons responsive to the relative angular displacement of said speed control means and said drive shaft whereby to provide a controlled speed torque multiplier.

7. A fluid pressure energy translating device comprising in combination a fluid motor, said motor having at least one cylinder bore and a piston reciprocal therein, a reaction member adapted to coact with each piston, displacement changing means to vary the displacement of each piston, a drive shaft rotatably driven by said motor, valving means arranged to phase fluid into and out of each cylinder bore to drive each piston, said control means including a low power rotating control means, differential drive means interposed between said low power rotating control means and said drive means, said differential drive means including a first gear driven by said drive means, a second gear driven by said low power rotating control means, a cage member mounted for rotational movement responsive to a speed differential between said gears, and means responsive to the rotational movement of the cage to vary the power output of said device, whereby to provide a conrtolled speed output.

8. A fluid pressure energy translating device comprising in combination a fluid motor, said motor having at least one cylinder bore and a piston reciprocal therein, a reaction member adapted to coact with each piston, displacement changing means to vary the displacement of each piston, a drive shaft rotatably driven by said motor, valving means arranged to phase fluid into and out of each cylinder bore to drive each piston; power control means, said control means including a low power rotating control means, differential drive means interposed between said low power rotating control means and said drive means, said differential drive means including a first gear driven by said drive means, a second gear driven by said low power rotating control means, a third gear interposed between said first and second gears, said gears being mounted to allow angular displacement of said third gear when the speed of the driven load varies from the speed of the low power input speed control means, and means responsive to said angular displacement to vary the power output of said device, whereby to provide a controlled speed output.

9. A fluid pressure energy translating device comprising in combination a fluid motor, said motor having at least one cylinder bore and a piston reciprocal therein, a reaction member adapted to coact with each piston, displacement changing means to vary the displacement of each piston, a drive shaft rotatably driven by said motor, valving means arranged to phase fluid into and out of each cylinder bore to drive each piston; power control means, said control means including a low power rotating control means, differential drive means interposed between said low power rotating control means and said drive means said differential drive means including a first gear driven by said drive means, a second gear driven by said low power rotating control means, a cage member mounted for rotational movement responsive to a speed differential between said gears, valve means adapted to deliver a control signal, means responsive to said control signal to change the power output of said device, and link means operably interconnecting said valve means and said cage and adapted to actuate said valve means responsive to the angular displacement of said cage, whereby to provide a controlled speed output.

10. A fluid pressure energy translating device comprising in combination a fluid motor, said motor having at least one cylinder bore and a piston reciprocal therein, a reaction member adapted to coact with each piston, displacement changing means to vary the displacement of each piston, a drive shaft rotatably driven by said motor, valving means arranged to phase fluid into and out of each cylinder bore to drive each piston; power control mean, said control means including a low power rotating control means, differential drive means interposed between said low power rotating control means and said drive means, said differential drive means including a first gear driven by said drive means, a second gear driven by said low power rotating control means, a cage member mounted for rotational movement responsive to a speed differential between said gears, valve means adapted to deliver a control signal, means responsive to said control signal to change the power output of said device, link means pivotally interconnected between said valve means and said cage, means to adjust the connection of said link means and said cage, with respect to the center of rotation of the cage to thereby vary the sensitivity of the control means.

References Cited in the file of this patent

UNITED STATES PATENTS

| | | |
|---|---|---|
| 979,802 | Sahlin | Dec. 27, 1910 |
| 2,265,314 | Rose | Dec. 9, 1941 |
| 2,302,538 | Von Tavel | Nov. 17, 1942 |
| 2,987,054 | Eddy | June 6, 1961 |